United States Patent [19]

Pape

[11] Patent Number: 4,708,612

[45] Date of Patent: Nov. 24, 1987

[54] APPARATUS FOR INTRODUCING TRANSPORT ANCHORS INTO A MOLD FOR CONCRETE PARTS

[75] Inventor: Harald Pape, Detmold, Fed. Rep. of Germany

[73] Assignee: Deha Baubedarf GmbH & Co. KG, Gross-Gerau, Fed. Rep. of Germany

[21] Appl. No.: 809,920

[22] PCT Filed: Mar. 23, 1985

[86] PCT No.: PCT/EP85/00127

§ 371 Date: Dec. 2, 1985

§ 102(e) Date: Dec. 2, 1985

[87] PCT Pub. No.: WO85/04360

PCT Pub. Date: Oct. 10, 1985

[30] Foreign Application Priority Data

Mar. 30, 1984 [DE] Fed. Rep. of Germany ... 8409825[U]

[51] Int. Cl.$^4$ .............................................. B29C 23/00

[52] U.S. Cl. ...................................... 425/117; 29/809; 198/468.2; 221/210; 249/91; 414/224; 414/226; 425/126 R

[58] Field of Search ................... 425/110, 117, 126 R; 29/809; 198/468.2; 221/210, 219, 220; 249/83, 85, 91, 88, 96, 97; 52/699, 125.4, 125.5; 414/224, 225, 226

[56] References Cited

U.S. PATENT DOCUMENTS

| | | | |
|---|---|---|---|
| 1,818,408 | 8/1931 | Lane | 29/809 |
| 3,423,792 | 1/1969 | Morin | 425/126 R |
| 3,501,826 | 3/1970 | Marcus | 29/809 |
| 3,543,376 | 12/1970 | Lovell et al. | 29/809 |
| 3,543,910 | 12/1970 | Devol | 198/468.2 |
| 3,891,014 | 6/1975 | Gunn | 29/809 |
| 4,296,909 | 10/1981 | Haeussler | 249/94 |

FOREIGN PATENT DOCUMENTS

| | | | |
|---|---|---|---|
| 1275278 | 8/1968 | Fed. Rep. of Germany . | |
| 2935825 | 12/1980 | Fed. Rep. of Germany . | |
| 3219139 | 11/1983 | Fed. Rep. of Germany . | |
| 0039841 | 4/1981 | Japan | 29/809 |

*Primary Examiner*—Willard E. Hoag
*Attorney, Agent, or Firm*—Burns, Doane, Swecker & Mathis

[57] ABSTRACT

Transport anchors to be introduced into moulds for concrete parts are held at disposal in a magazine. An ejection device transversally displaceable with respect to the longitudinal axis of the lowest transport anchor in the magazine brings the transport anchor to a gripping member which grips the head of the transport anchor. By means of a displaceable carriage carrying the gripping member, the transport anchor seized by the gripping member is introduced into the mould by its free end.

20 Claims, 6 Drawing Figures

APPARATUS FOR INTRODUCING TRANSPORT ANCHORS INTO A MOLD FOR CONCRETE PARTS

BACKGROUND AND OBJECT OF THE PRESENT INVENTION

The present innovation relates to a device for the insertion of transportation anchors into a casting mold for concrete parts, preferably into a casting mold for concrete pipes.

The weight of concrete parts is often so great that the laying is only possible with the aid of a lifting apparatus. This is particularly true for concrete pipes laid in the ground. In order to fasten chains, ropes or the like, at least one transportation anchor should be provided on the outside surfaces and must not stand out from the outside surfaces, because otherwise a considerable risk of breaking during transportation would exist.

Concrete parts are produced in a casting mold corresponding to their respective shape which is referred to in the pertinent branch as the concrete form. The transportation anchors have to be inserted in their right position before the liquid concrete is filled into the casting mold.

For inserting the transportation anchors support means are used whereby the tranportation anchor is held in the casting mold by magnetic forces. When the concrete is filled in it often occurs that the transportation anchors are displaced out of their desired position. The arresting means which are especially provided for the transportation anchors can then only be fastened to the head end of the transportation anchor with difficulty or not at all during laying. The companies that use the concrete parts then often file complaints. Furthermore, a reduction in efficiency can be seen in the way the transportation anchors are inserted in the casting mold in an installation which produces concrete parts.

The object of the present innovation is to develop a device of the initially described type which increases the efficiency of a machine producing concrete parts and works as automatically as possible and safely, so that the desired position of the transportation anchors to be cast is maintained precisely.

BRIEF SUMMARY OF THE INVENTION

This object is attained according to the innovation by providing a magazine to hold the transportation anchors to be inserted at disposal, wherein a multitude of transportation anchors can be stored with their longitudinal axes parallel to one another, an output device that can be moved perpendicular to the longitudinal axis of each transportation anchor between two terminal positions to deliver a transportation anchor each time to a gripper which grips the transportation anchor at its head end and holds it and which is attained to a sled which is displaceable in the direction of the longitudinal axis of the transportation anchor, by which means the transportation anchor can be inserted with its free end into the casting mold. It is now possible to keep a larger amount of transportation anchors on hand in the magazine for working.

Depending on the performance of the machine producing the concrete parts the magazine must be refilled in certain intervals. During production of a concrete part, the operating personnel do not have to take any measures to insert the transportation anchor into the casting mold, because the device works automatically. Care must only be taken that the magazine is refilled before it is completely empty. With the output device which can be moved perpendicularly to the longitudinal axis of the respective transportation anchor, a sure delivery to the gripper inserting the transportation anchor into the casting mold is guaranteed, because the transportation anchor offers a large working surface. Because the respective transportation anchor is taken over by a gripper, not only a sure delivery is guaranteed, but also an insertion in the right position into the casting mold. Because the gripper is furthermore attached to a displaceable sled, the control can be set in such a way, that the gripper only releases the transportation anchor after the casting mold is filled. If necessary, the gripper can continue to hold the transportation anchor during the setting period of the concrete filled in. Deviations from the desired position are eliminated in this way. Because the insertion is now carried out automatically, except for the refilling of the magazine, the performance of a machine producing concrete parts is increased by the application of the device according to the innovation.

According to a preferred embodiment it is provided that the magazine is a vertical magazine, into which the transportation anchors can be inserted from above and lie on top of each other with their longitudinal axes in a vertical plane, and that the output device is disposed in the lower region of the magazine and is displaceable in a horizontal plane. Through such an arrangement not only a safe and overseeable construction is achieved but also the filling of the magazine from its top side is made possible, so that it can be carried out independent of withdrawl, because the lowermost transportation anchor is pulled out by the output device, in each instance.

A particularly simple construction design of the output device is given which works safely, when the output device is provided as a slide driven by a piston-cylinder unit which has at its free end a receiving shell for a transportation anchor that can be swivelled around a horizontal axis and is open towards the magazine.

The gripper becomes especially easy, if it is formed out of two jaws that can be swivelled around a common horizontal axis in opposite directions. It is particularly advantageous hereby, that the jaws have a recess on the inner surfaces which face each other that corresponds to the head shape of the transportation anchor, whereby in closed condition of the jaws the head end of the transportation anchor lies in the cavity formed by the recesses. Through such an embodiment the transportation anchor is transported form-lockingly and held so that a displacement out of the desired position is practically impossible.

Because the head end of the transportation anchor to which a rope or a chain is fastened during transportation or laying has to lie in a recess, it is particularly advantageous that the gripper has the shape of a spherical segment in the closed state of its jaws at the frontal side facing the free end of the transportation anchor, because then it is possible to obtain the recess required on the outside of the concrete part through the jaws. To achieve this, the sled has to be moved so far in the direction of the casting mold, that the spherically shaped part of the gripper comes to lie within the casting mold.

DESCRIPTION OF THE DRAWINGS

Further features and characteristics of an advantageous embodiment of the present innovation are the object of further dependent claims and follow from the following description of a preferred embodiment example.

DETAILED DESCRIPTION OF A PREFERRED EMBODIMENT OF THE INVENTION

Figure 1:
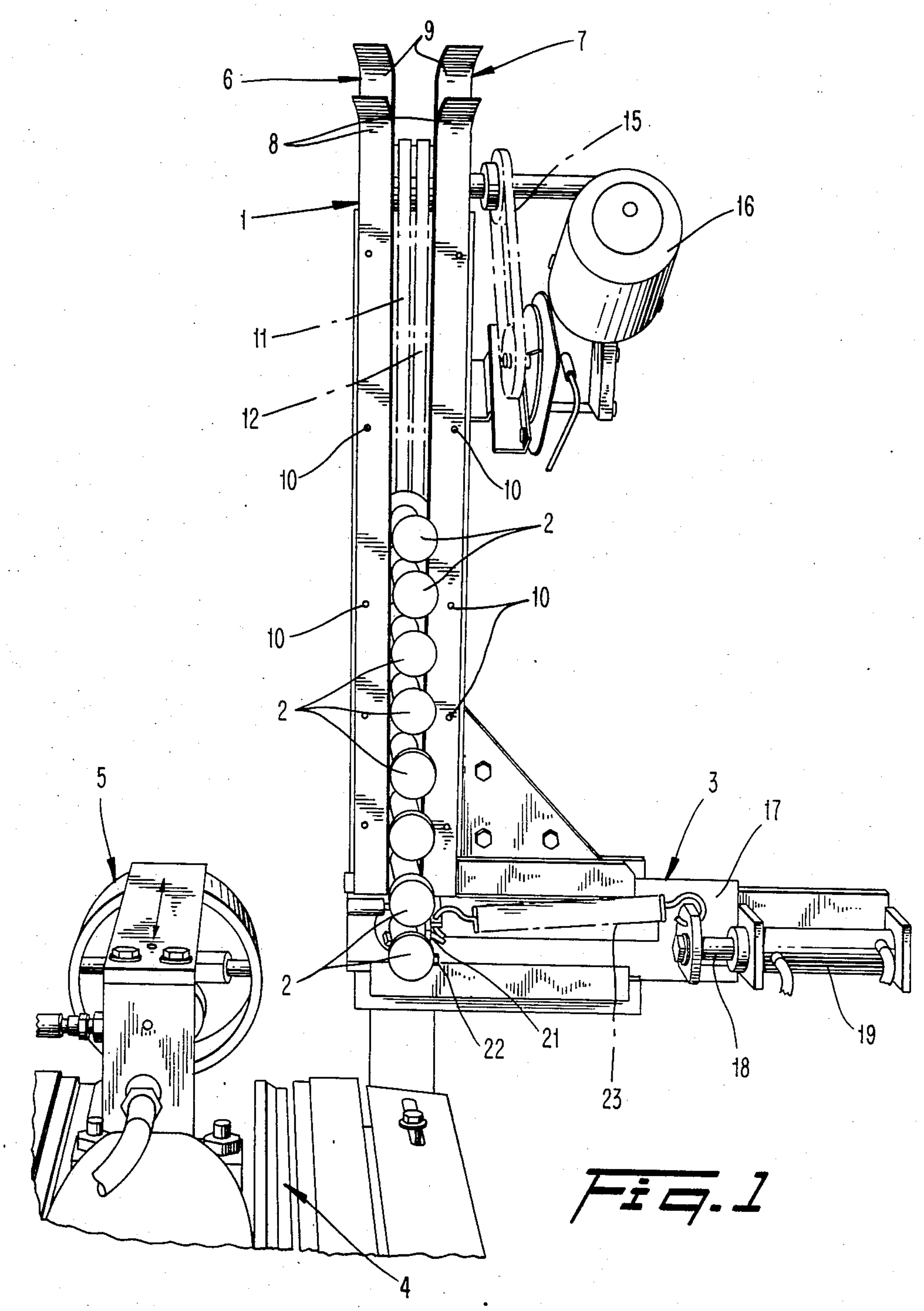
FIG. 1 is a device according to the invention in a perspective view.

The device shown in FIG. 1 consists essentially of a vertical magazine 1 in which several transportation anchors 2 are stored on top of one another in a manner to be described in more detail further below, an output device 3 which can be moved perpendicular to the longitudinal axis of the transportation anchors, and a sled 4 which can be moved in the direction of the longitudinal axis of the transportation anchor 2 and which has a gripper 5 at the end facing the vertical magazine 1 which can be opened and closed.

Figure 2:
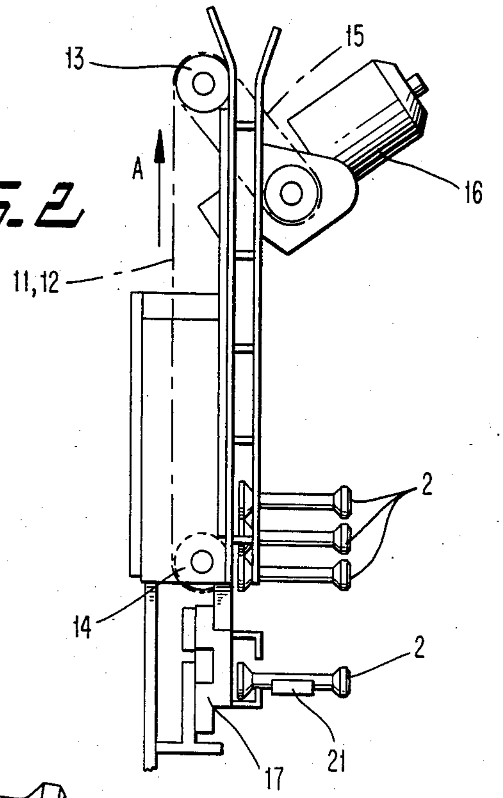
FIG. 2 is a side view corresponding to FIG. 1, but in a reduced scale, which shows the magazine.
Figure 3:
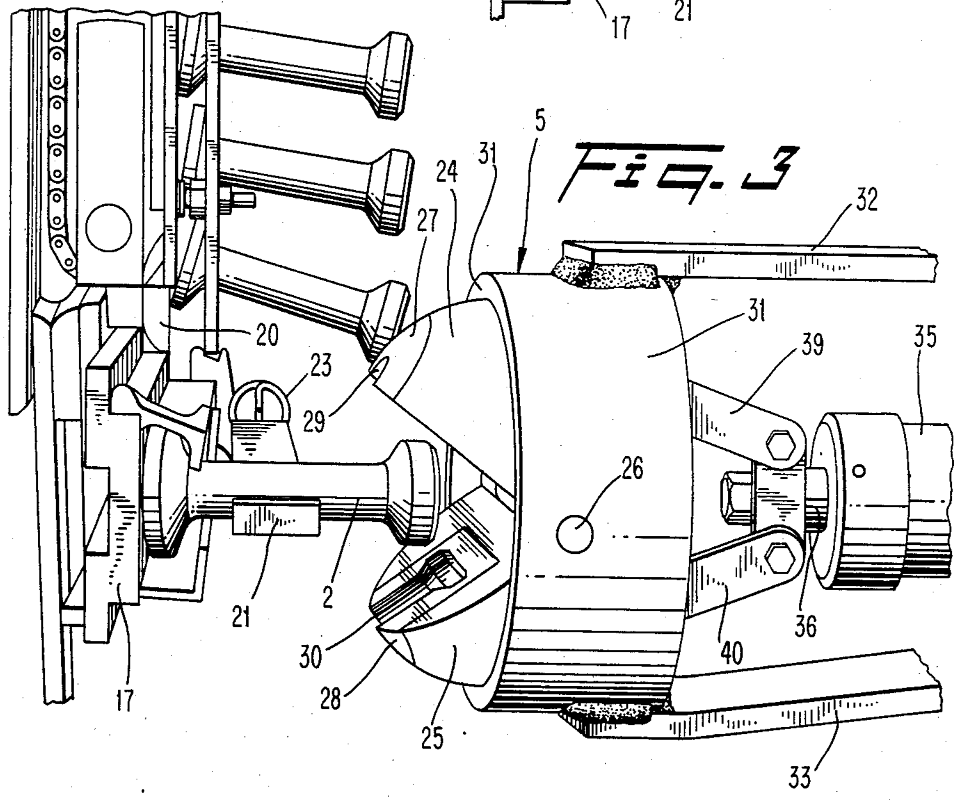
FIG. 3 is a perspective view corresponding to FIG. 1, which shows the lower end of the magazine and the opened gripper, during the takeover of a transportation anchor.
Figure 6:
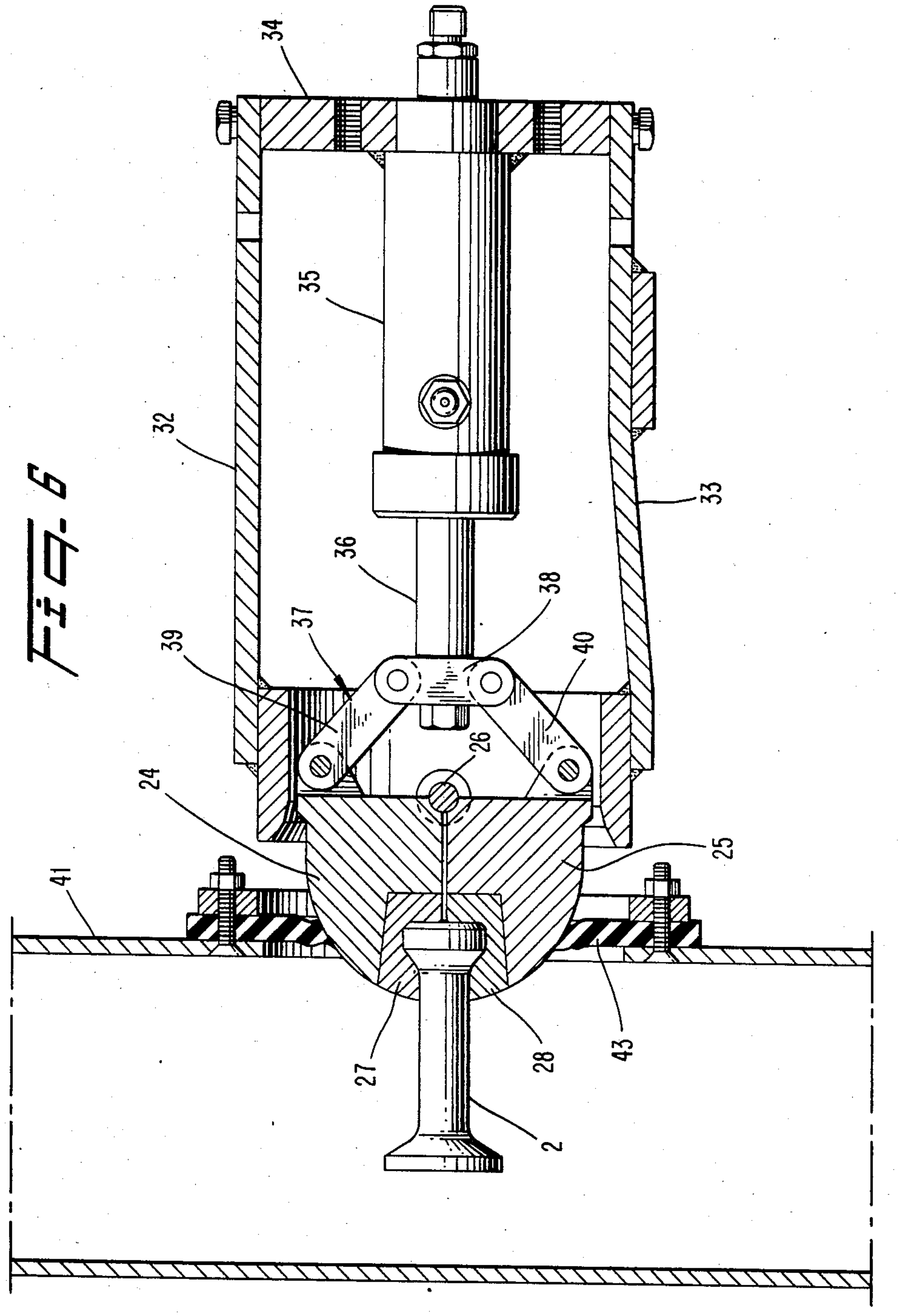
FIG. 6 shows the gripper carrying a transportation anchor and brought into the casting mold, in a cross-sectional view.

Each transportation anchor 2 is provided with extensions of larger diameter at its ends, as shown in particular in FIGS. 2, 3 and 6. The extension lying within the concrete part which is not shown is larger than the extension grasped by the gripper 5 during insertion into the casting mold.

The magazine 1 is provided with two guides 6, 7 disposed in a vertical direction which are aligned and spaced apart from one another. Each guide 6, 7 is formed by two guide rails 8, 9 spaced apart from one another. The guide rails 8, 9 are disposed parallel to one another and are firmly attached via spacing bolts 10. In the guides 6, 7 the extension of the transportation anchor 6 which is encased by concrete in the finished concrete part is slidingly guided. The guides 6, 7 are to be seen in the sense of a T-shaped guidance. As can be seen in particular in FIGS. 2 and 3, the transportation anchors 2 stored in the vertical magazine 1 project forwards i.e. in the direction of the sled 4. On the backside the vertical magazine is provided with two roller chains 11, 12 which are disposed next to each other in a vertical direction and which are guided over two chain wheels 13, 14 each arranged in the upper and lower region of the vertical magazine 1 on a shaft. The upper chain wheels 13 constitute the drive chain wheels which are driven over a further chain 15 and a chain wheel arranged on the same shaft by a geared engine 16. The geared engine 16 is hooked up in such a way that the stringers of the roller chains 11, 12 facing the transportation anchors 2 are moved from the top to the bottom.

The output device 3 consists of a slide 17 which is attached to the piston rod 18 of a fixedly arranged hydraulic cylinder 19. The slide 17 is guided in a guide 20 in a manner not described in more detail. On the free end facing the gripper 5 a receiving shell 21 which is open at the top is swivellably mounted on the slide 17. The swivel axis is designated 22. Above the swivel axis 22 a return spring 23 is hinged on the receiving shell 21 and its opposite end is hinged on the slide 17 above the piston rod 18.

Figure 4:
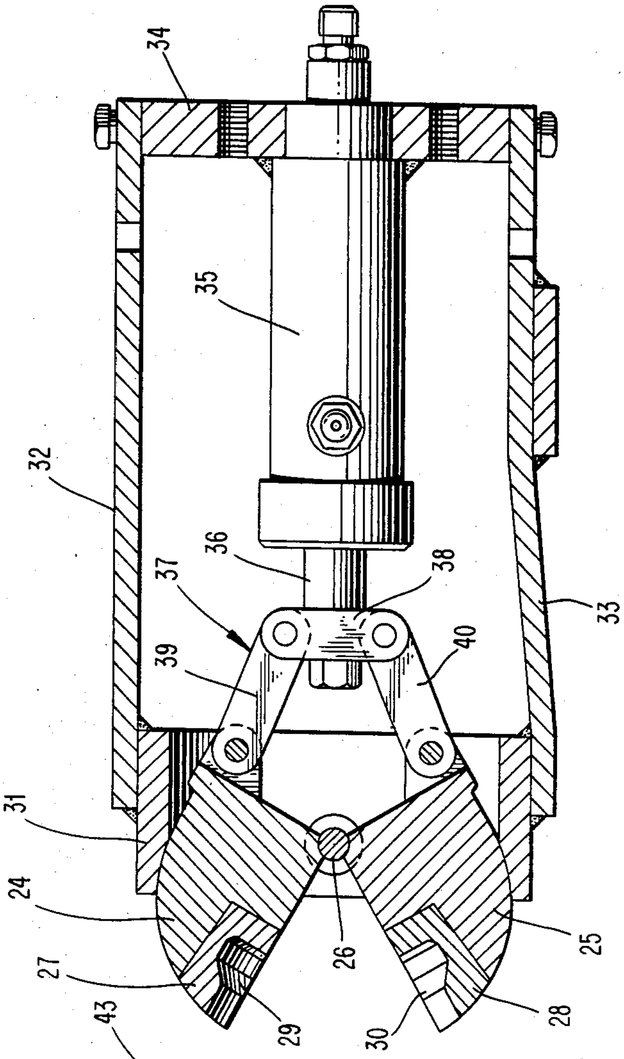
FIG. 4 shows the gripper in opened position in a cross-sectional view.

In FIGS. 3, 4 and 6 the gripper 5 is shown in more detail. The gripper 5 consists of two jaws 24, 25 which can be swivelled about a horizontal axle 26, whereby the axle 26 lies opposite to the jaw side which grasps a transportation anchor 2. In the present embodiment example, the jaws 24, 25 are shaped as solid bodies and resemble a hemisphere in shape in closed condition. Each jau 24, 25 is provided with an insert 27, 28 on the side opposite to axle 26 which is firmly inserted in corresponding recesses.

Each insert 27, 28 is provided with a recess 29, 30 which reaches up to a rim facing away from the axle 26 and which forms a hollow chamber corresponding to the shape of the head of the transportation anchor 2, when the jaws 24, 25 are in a closed state. The axle 26 is supported in a guide ring 31 with torsion strength. As can be seen in particular in FIG. 4, the guide ring 31 provides a guide for the outer faces of the jaws 24, 25 on its inner side in the region of the frontal side facing the recesses 29, 30. This part is accordingly bow-shaped. The guide ring 31 is supported by two support straps 32, 33 which are welded on the outside of the guide ring 31. The support bars 32, 33 are firmly attached to the sled 4 in a manner not described in more detail. The ends of the support bars 32, 33 opposite the guide ring 31 are connected by a side bar 34, so that the support bars 32, 33 and the side bar 34 form a U-shaped support. On the side facing the gripper 2, a piston-cylinder unit 35 is attached to the side bar 34, in the instant embodiment example a hydraulic cylinder which has a piston rod 36 which can be driven out in the direction of the gripper 2, and supports an actuating rod assembly 37 which is flexibly connected with the facing frontal surfaces of the jaws 24, 25. The actuating rod assembly 37 consists of a lashing 38 firmly mounted on the piston rod 36 and two guide rods 39, 40 pivoted on the jaws 24, 25.

Figure 5:
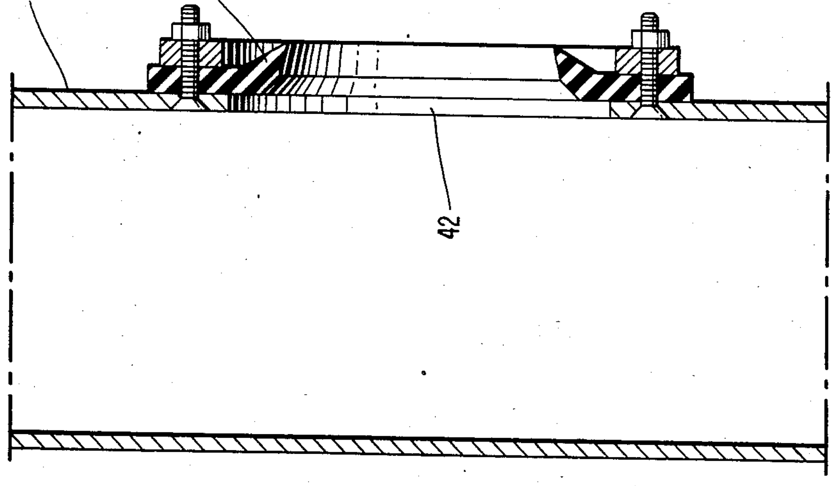
FIG. 5 is a partial view of the casting mold in cross-section, showing the opening for the bringing in of the gripper.

In FIG. 5 a partial cut-out of a casting mold 41 is shown which is shaped in the present embodiment example for producing concrete tubes. In the outside wall an opening 42 is provided into which a sealing 43 projects which is attached to the casting mold 41. In FIG. 6 it is shown that the jaws 24, 25 project a certain predetermined amount into the casting mold 41 through the movement of the sled. By driving out the piston rod 36 of the piston-cylinder unit 35, the jaws 24, 25 were closed beforehand, however.

To operate the device, the vertical magazine 1 must first be filled with transportation anchors 2. The lowermost lying transportation anchor 2 is received by the receiving shell 21 for delivery into the casting mold 41. The piston rod 18 is driven out by action on the piston of the hydraulic cylinder 19, whereby the transportation anchor is moved in a first direction perpendicular to the longitudinal axis of the anchor to an extended position in which the anchor is aligned with the central longitudinal axis of the gripper 5. This position is shown in FIG. 3. The jaws 24, 25 are still open, but are closed shortly thereafter by driving out of the piston rod 36 of the piston-cylinder unit 35. The transportation anchor 2 is then securely held and held in the right place due to the shape of the recesses 29, 30. Over a cam not shown the receiving shell 21 is then rotated in such a way that the slide 17 can be driven back into the initial position by reversing the hydraulic cylinder 19. The return spring 23 causes a swivel back motion of the receiving shell 21. During the delivery of the bolt to the gripper 5 the lower transportation anchor 2 in the vertical magazine 1 rests on the return spring 23 so that further slippage is not possible. As soon as the jaws 24, 25 are closed and the slide 17 is driven back, the sled 4 and with it the gripper 5 and the transportation anchor 2 contained therein can be driven in a second direction perpendicular to the first direction and parallel to the longitudinal axis of the anchor, toward the casting mold by a drive not described in more detail. The casting mold can then be cast out with concrete. Because the sealing 43 rests sealingly against the outside of the jaws 24, 25, no concrete can run out of the casting mold 41. Because, furthermore, the jaws 24, 25 project into the casting mold 41, a recess is formed in the concrete part to which a rope or a chain can later be attached. The sled 4 is driven so far, that the transportation anchor 2 is in alignment with the outer surface of the later concrete part, or projects only a small amount relative to its length.

As soon as the concrete has hardened enough, the jaws 24, 25 can be opened by reversal of the piston-cylinder unit 35, because the longitudinal axis of the horizontal axle 26 constitutes the center of curvature for jaws 24, 25. After opening of the jaws 24, 25 the sled can be driven back into its initial position. The delivery process can then be started again. In order to make sure that a transportation anchor 2 is in the receiving shell 21, the geared engine 16 is turned on in the vertical magazine to prevent canting of the transportation anchors. The roller chains 11, 12 then turn in the direction of the arrow A, and a canted transportation anchor 2 is also moved downwards by friction contact.

I claim:

1. Apparatus for inserting transportation anchors into a casting mold for forming concrete parts such as concrete pipes, said apparatus comprising:

a magazine for storing a plurality of anchors and including an outlet at which one of said anchors is disposed, an output mechanism for moving said one anchor from said outlet to an extended position in a first direction perpendicular to a longitudinal axis of said one anchor, a sled movable forwardly toward said casting mold in a second direction which is perpendicular to said first direction and parallel to said longitudinal axis of said one anchor disposed in said extended position, and a gripper carried by said sled and positioned in alignment with said one anchor disposed in said extended position, said gripper being arranged to grip a first longitudinal end of said one anchor and transport said one anchor from said extended position to a terminal position at said casting mold as said sled is moved forwardly in said second direction, said gripper gripping said first longitudinal end such that said one anchor extends forwardly in said second direction.

2. Apparatus according to claim 1, including said casting mold which includes an opening into which the front ends of said jaws can travel, a sealing surrounding said opening to seal around said jaws and enable concrete to be poured into said casting mold with an anchor positioned therein by said jaws.

3. Apparatus according to claim 1, wherein said magazine is a vertical magazine having an upper end into which the transportation anchors are inserted to lie with their longitudinal axes disposed horizontally in a common vertical plane, said output device arranged adjacent a lower end of said magazine and movable horizontally in said first direction.

4. Apparatus according to claim 3, wherein said magazine is T-shaped in cross-section and constitutes a guide for the transportation anchors.

5. Apparatus according to claim 4, wherein said outlet is formed by two pairs of guide rods, each pair arranged parallel to one another and spaced apart and firmly attached by spacing bolts.

6. Apparatus according to claim 4, wherein said T-shaped guide is provided with at least one drivable transportation means for moving the anchors to said outlet.

7. Apparatus according to claim 6, wherein said transportation means comprises two synchronously running roller chains guided, each being guided over chain wheels provided in upper and lower regions of the vertical magazine and driven by an engine.

8. Apparatus according to claim 1, wherein said output mechanism includes a slide driven by a piston-cylinder unit and carrying a receiving shell for carrying a transportation anchor, said shell being rotatable about a horizontal axis and being open towards the magazine.

9. Apparatus according to claim 8, including a return spring attached at one end to the slide and at the opposite end to the receiving shell.

10. Apparatus according to claim 8, wherein said piston-cylinder unit comprises a hydraulic cylinder.

11. Apparatus according to claim 1, wherein said gripper comprises two jaws pivotable about a common horizontal axis toward and away from each other.

12. Apparatus according to claim 11, wherein said jaws are provided with recesses formed in internal mutually facing surfaces, said recesses shaped to correspond to the shape of an end of the transportation anchor, whereby in the closed-state of the jaws, the end of the transportation anchor lies in a hollow chamber defined by the recesses together, said recesses extending to the rims of the jaws to form a passage through which the anchor extends.

13. Apparatus according to claim 12, wherein each said jaw carries an insert in which said recess is formed.

14. Apparatus according to claim 11, wherein each said jaw is shaped as a semi-spherical segment.

15. Apparatus according to claim 14, wherein said horizontal axis constitutes the center of curvature for the semi-spherical segments.

16. Apparatus according to claim 11 including a piston-cylinder unit including a piston rod, a pair of actuating rods interconnecting said piston rod and said segments for pivoting said segments toward and away from one another.

17. Apparatus according to claim 16, wherein said piston-cylinder unit comprises a hydraulic cylinder.

18. Apparatus according to claim 11, wherein said horizontal axis is mounted in a guide ring within which said segments are displaceable.

19. Apparatus according to claim 18, wherein said guide rings are attached to two support rods which lie diametrically opposite to each other, a side bar interconnecting free ends of the support rods over a lashing, said side bar and support rods together forming a U-shaped support attached to said sled.

20. Apparatus according to claim 19, wherein said piston-cylinder unit is connected to said side bar.

* * * * *